US006675219B1

(12) United States Patent
Leppinen et al.

(10) Patent No.: US 6,675,219 B1
(45) Date of Patent: Jan. 6, 2004

(54) TECHNIQUE FOR IMPROVING THROUGHPUT OF A GATEWAY INTERFACE

(75) Inventors: Mika Leppinen, Woburn, MA (US); Sachin Padma, Boston, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/431,071

(22) Filed: Nov. 1, 1999

(51) Int. Cl.⁷ .......................... G06F 15/16; G06F 17/00
(52) U.S. Cl. ..................... 709/230; 715/501.1; 715/513
(58) Field of Search ................................ 370/231, 401; 709/238, 213, 230; 707/10; 715/513, 501.1

(56) References Cited

U.S. PATENT DOCUMENTS

| 5,832,227 A | * | 11/1998 | Anderson et al. ........... 709/224 |
| 6,005,885 A | * | 12/1999 | Warren et al. .............. 340/7.43 |
| 6,199,107 B1 | * | 3/2001 | Dujari ......................... 709/219 |
| 6,226,279 B1 | * | 5/2001 | Hansson et al. ............ 370/328 |
| 6,317,831 B1 | * | 11/2001 | King ........................... 380/223 |
| 6,356,529 B1 | * | 3/2002 | Zarom ......................... 370/231 |
| 6,363,419 B1 | * | 3/2002 | Martin et al. ............... 709/219 |
| 6,578,113 B2 | * | 6/2003 | Krishnamurthy et al. ... 711/141 |

OTHER PUBLICATIONS

Wireless Application Protocol:Wireless Markup Language specification Version 1.1. WAP WML Jun. 1999.*
Fielding, R., Hypertext Transfer Protocol—HTTP/1.1, Internet–Draft<draft–ietf–http–v11–spec–o6>. Aug. 12, 1996.*
"WAP WML —Wireless Application Protocol, Wireless Markup Language Specification, Version 1.1"; Jun. 16, 1999.*
Easton, A. et al.; Eurescom Project P908; "OSS Interconnection Gateway Validation—vol. 4–Annex 3—Ordering Carrie Pre–Selection Case Study Results—including XML message definitions"; Jul. 2001.*
WAP Architecture Version Apr. 30, 1998 "Wireless Application Protocol Architecture Specification", Apr., 1998, XP–002184867.
WAP White Paper, "Au System Radio", Feb. 1999, XP002901226.

* cited by examiner

*Primary Examiner*—Marc D. Thompson
(74) *Attorney, Agent, or Firm*—Antonelli, Terry, Stout, & Kraus, LLP

(57) ABSTRACT

A technique for improving throughput of a gateway interface includes: a client, e.g., a wireless client, forwarding a request to a server via the gateway; determining in the server whether the requested content has been validated, and if so, setting a predetermined header to "validated" and forwarding the requested content to the gateway, and if not, either setting the predetermined header to "not validated" or not setting the predetermined header, and forwarding the requested content to the gateway. The gateway determines whether the predetermined header of the forwarded content has been set to "validated," and if so, forwards the requested content to the client after encoding the validated content, and if not, validates the content and then encodes the validated content and forwards it to the client. In this way, the gateway does not have to needlessly validate requested content which had already been validated.

12 Claims, 2 Drawing Sheets

TECHNIQUE FOR IMPROVING THROUGHPUT OF A GATEWAY INTERFACE

BACKGROUND OF THE INVENTION

2. Field of the Invention

The present invention relates to the field of gateway interfaces and more particularly, the present invention relates to a technique for improving the throughput of a gateway interface.

2. Description of the Related Art

The Wireless Application Protocol (WAP) is an open global specification that allows mobile users with wireless devices to easily access information and interact with services without delay.

Stated differently, the Wireless Application Protocol is an application environment and set of communication protocols for wireless devices which have been designed to enable access to the internet and advance telephony services independently of the manufacturer of the wireless device used.

The WAP allows mobile devices to interface with the internet as well as interfacing with corporate intranets and allows the delivery of a wide range of value added services to the wireless subscribers or clients while being independent of the network and wireless terminal. This allows wireless subscribers to access the vast store of information available on the internet using a handheld wireless device in the same fashion as presently available utilizing a desktop computer connected by land-line to an internet provider.

A Wireless Application Protocol gateway is the interface between the wireless client and an internet or intranet web server.

Normally, upon a request from a client, a web server forwards content to the WAP gateway.

The WAP gateway, prior to encoding the content from one format into content in another format, validates the content. The validation of the content is a time consuming operation and is performed by the WAP gateway whether or not the web server had previously validated the content.

Thus, the content may be twice validated, needlessly consuming time and resources. This occurs because of the fact that the WAP gateway receives no information as to whether or not the content had been previously validated by the web server.

SUMMARY OF THE INVENTION

To overcome the above-noted problem, what is proposed is a technique for improving the throughput of a gateway interface by enabling the web server to inform the gateway as to whether or not the content has been previously validated by the web server utilizing, for example, HTTP headers.

The above-noted technique includes a client forwarding a request to the server for content via the gateway which is disposed between the client and the server. The server then determines if the requested content has been validated and if so, sets a predetermined header to "validated" and forwards the requested content to the gateway and if not, either sets the predetermined header to "not validated" or does not set the predetermined header and forwards the requested content to the gateway. The gateway, upon receiving the forwarded requested content, determines if the predetermined header of the forwarded requested content has been set to "validated" and if so, forwards the requested content to the client after encoding it and if not, validates the content and then encodes it and forwards the validated content to the client.

DESCRIPTION OF THE PREFERRED EMBODIMENT

Figure 1:
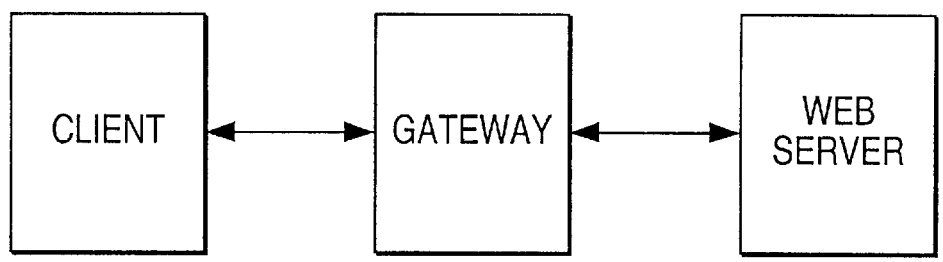
FIG. 1 is a block diagram of the flow of information between an internet or intranet web server and a client.

FIG. 1 illustrates the basic flow of information between an internet or intranet web server and a wireless client, for example, via a gateway interface, for example, a WAP gateway.

Normally, the web server validates content prior to sending it to the WAP gateway in response to a request from the wireless client.

The WAP gateway first validates the content with a Wireless Markup Language (WML) validator, for example, prior to encoding the content into WML or WML script content, for example, utilizing a WML encoder or WML script encoder.

Since, in the past, the WAP gateway has no way of knowing whether or not the content has been validated, it has been necessary for the WAP gateway to validate the content from the web server irrespective of whether or not the web server has already validated the content.

In accordance with the present invention, however, the web server sets, for example, a validation header, that is, perhaps an HTTP header, such as an Etag header, of the content to "validated" subsequent to determining that the content has been validated and then forwards the content with the validation header to the WAP gateway.

The WAP gateway receives the content along with its HTTP headers and then checks for the presence of a validation header.

If the validation header is found and if it has been set to "validated," then the WAP gateway encodes the content utilizing a WML or WML script encoder, for example, and passes the WML or WML script content to the wireless client using the proper WAP (Wireless Application Protocol) without needlessly validating the already validated content.

On the other hand, if no validation header has been found or if it has been set to "not validated," then the WAP gateway validates the content prior to encoding it.

By the use of a validation header, such as an HTTP header, the web server can inform the WAP gateway as to whether or not the content has been validated, thereby allowing the WAP gateway to avoid needlessly validating an already validated content.

Figure 2:
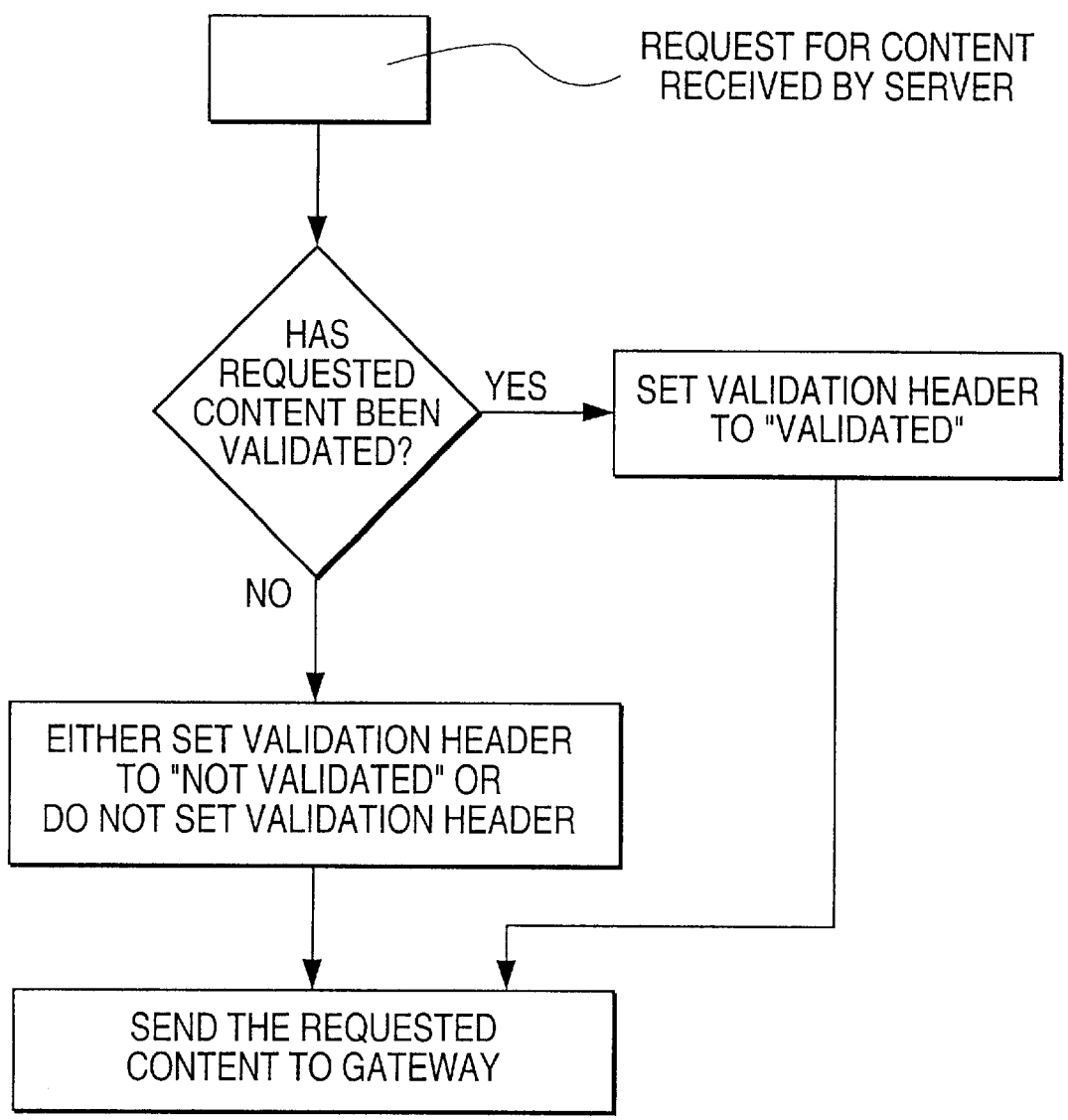
FIG. 2 is a flowchart of operations performed by a web server in accordance with the present invention.

More particularly, referring to FIG. 2 the web server first receives a request for content from the wireless client via the WAP gateway, for example.

The server then determines if the requested content is available and has been validated.

If the requested content has been validated, then the web server sets a validation header, perhaps an HTTP Etag header, for example, attached to the content to "validated" and forwards the content with the set validation header to the WAP gateway.

On the other hand, if the requested content has not been validated, then the server either sets the validation header to "not validated" or does not set the validation header at all and then sends the unvalidated content to the WAP gateway.

Figure 3:
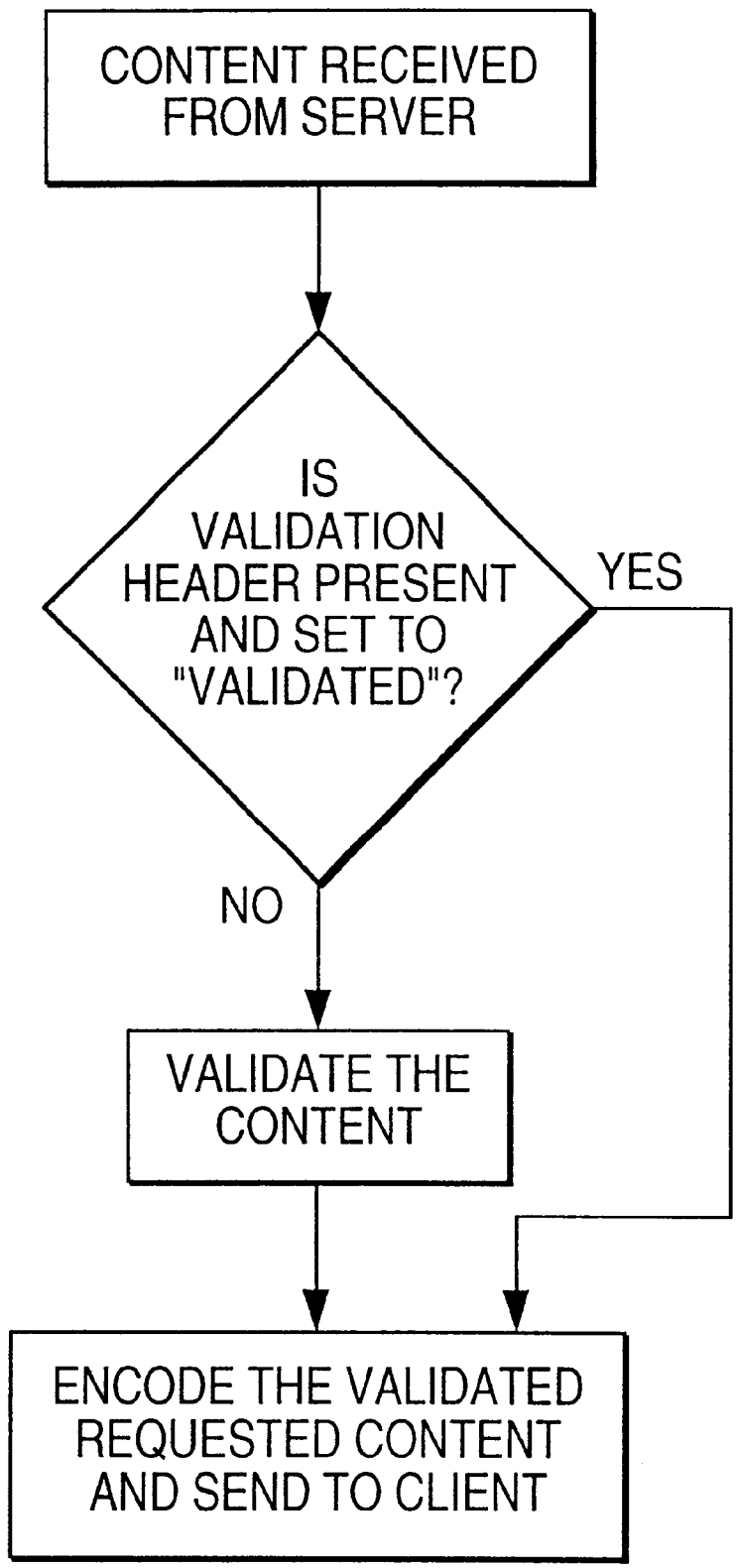
FIG. 3 is a flowchart of operations performed by a gateway interface in accordance with the present invention.

As illustrated in FIG. 3, the WAP gateway, for example, first receives the content from the web server.

The gateway then determines if a validation header, such as an HTTP Etag header, is present and has been set to "validated."

If the validation header is present and has been set to "validated," then the WAP gateway immediately encodes the content utilizing the WML or WML script encoder and forwards the encoded WML or WML script content to the wireless client using the Wireless Application Protocol.

On the other hand, if the validation header is not present or is present and is not set to "validated," then the WAP gateway first validates the content prior to encoding the content into WML or WML script content utilizing the WML or WML script encoder and then forwards the encoded WML or WML script content to the wireless client using the Wireless Application Protocol.

In this way, the transfer of information between the web server and the wireless client is optimized in that the WAP gateway interface throughput has been increased by eliminating the needless validation of already validated content.

While in the above-noted example, a WAP gateway is used, the WAP gateway encoding the content using a WML or WML script encoder, the present invention is not limited to such encoding and such a gateway. All XML (extended markup language) based content types can be validated against DTD (document type definition).

The DTD are the rules determined by an application that apply an SGML (Standard Generalized Markup Language), which is a syntax for markup languages that formalizes markup and frees it of system and processing dependencies to the markup language, to documents of a particular type. The SGML provides the syntax for the markup language, and the DTD provides the vocabulary for the markup language.

The most common encoding currently used by WAP gateways is WML text format to WML binary format. The present invention, however, is not limited to this encoding format.

The validation referred to above is defined as taking a document, for example, and checking that it is properly formed.

XML documentation can be defined by using a DTD. The XML parser reads the DTD and the XML document and checks that the document is properly formed. A specific content type can have additional validation steps, e.g., WML which is based on XML defines extra validation steps so that to validate a WML document, one first needs to validate the document against XML and then an additional validation of the document is required by WML.

As to the specifications of the WAP gateway, there is no single specification defining such a gateway because the specifications for the WAP gateway consist of multiple subcomponents that are specified by the WAP Forum.

While the invention has been described in terms of a single preferred embodiment, those skilled in the art will recognize that the invention can be practiced with modification within the spirit and scope of the appended claims.

Thus, having described our invention, what we claim is new and is desired to be secured by a letters patent is as follows:

What is claimed is:

1. A method of improving a throughput of a wireless gateway interface comprising the steps of:
    (a) receiving a request for content from a mobile client;
    (b) determining whether the requested content has been validated against document type definition (DTD), where the DTD defines rules for markup language syntax;
    (c) if the content has been validated against the DTD, setting a predetermined header to "validated" and forwarding the requested content to the wireless gateway;
    (d) if the content has not been validated against the DTD, either setting a predetermined header to "not validated" or not setting any validation header, and forwarding the requested content to the wireless gateway;
    (e) determining in the wireless gateway whether the forwarded requested content includes the predetermined header that has been set to "validated;"
    (f) if the content includes the predetermined header that has been set to "validated," forwarding the requested content to the mobile client from the wireless gateway; and
    (g) if the content does not include a header that has been set to "validated," validating the content against the DTD and then forwarding the content to the mobile client from the wireless gateway.

2. The method of claim 1, further comprising the step of encoding the validated content in the gateway prior to forwarding the content to the mobile client.

3. The method of claim 2, wherein the predetermined header comprises an HTTP (Hypertext Transfer Protocol) header.

4. The method of claim 3, wherein the HTTP header comprises an Etag header.

5. The method of claim 1, wherein the predetermined header comprises an HTTP (Hypertext Transfer Protocol) header.

6. The method of claim 5, wherein the HTTP header comprises an Etag header.

7. An apparatus for improving throughput of a wireless gateway interface, said apparatus comprising:
    a server adapted to receive, via a wireless gateway from a mobile client, a request for content, said server including means responsive to the requested content having been validated against document type definition (DTD), where the DTD defines rules for markup language syntax, for setting a predetermined header on the content to "validated" and forwarding the requested content to the wireless gateway, and responsive to the requested content not having been validated against the DTD, for either not setting any validation header on the content or setting a predetermined header on the content to "not validated," and then forwarding the requested content to the wireless gateway; and
    a wireless gateway, including means responsive to receipt of content forwarded from said server including a header that has been set to "validated," for forwarding the requested content to the mobile client, and responsive to receipt of content from said server not including a header that has been set to validated, for validating the content against the DTD and then forwarding the content to the mobile client.

8. The apparatus of claim 7, wherein said gateway further includes means for encoding the validated content prior to forwarding the content to the mobile client.

9. The apparatus of claim 8, wherein the predetermined header comprises an HTTP (Hypertext Transfer Protocol) header.

10. The apparatus of claim 9, wherein the HTTP header comprises an Etag header.

11. The apparatus of claim 7, wherein the predetermined header comprises an HTTP (Hypertext Transfer Protocol) header.

12. The apparatus of claim 11, wherein the HTTP header comprises an Etag header.

* * * * *